United States Patent [19]

Chevallier

[11] 4,347,017

[45] Aug. 31, 1982

[54] BARRIER BLOCK FOR PROTECTING COASTAL AND RIVERSIDE STRUCTURES

[75] Inventor: Arnauld Chevallier, Grenoble, France

[73] Assignee: Societe Grenobloise d'Etudes et d'Applications Hydrauliques (SOGREAH), Echirolles, France

[21] Appl. No.: 120,796

[22] Filed: Feb. 12, 1980

[30] Foreign Application Priority Data

Feb. 14, 1979 [FR] France ............................ 79 03774

[51] Int. Cl.$^3$ .............................................. E02B 3/04
[52] U.S. Cl. ......................................... 405/29; 405/33
[58] Field of Search ...................... 405/29, 33, 273, 21, 405/30; 52/608, 609

[56] References Cited

U.S. PATENT DOCUMENTS

| 1,467,929 | 9/1923 | Ey | 52/608 |
|---|---|---|---|
| 3,176,468 | 4/1965 | Nagai et al. | 405/29 |
| 3,380,253 | 4/1968 | Vita | 405/29 |
| 3,614,866 | 10/1971 | Kaneko et al. | 405/29 |

FOREIGN PATENT DOCUMENTS

| 758321 | 5/1967 | Canada | 405/29 |
|---|---|---|---|
| 1017546 | 12/1952 | France . | |
| 1242856 | 8/1960 | France . | |
| 2018428 | 5/1970 | France . | |
| 1593287 | 7/1970 | France . | |
| 2114280 | 6/1972 | France . | |
| 2166650 | 8/1973 | France . | |

Primary Examiner—David H. Corbin
Attorney, Agent, or Firm—Sughrue, Mion, Zinn, Macpeak & Seas

[57] ABSTRACT

A barrier block for defences protecting coastal and riverside structures, characterized in that it is constituted by a central core (1) of substantially cubic shape having firstly top and bottom faces (12) provided with respective top and bottom anvil-shaped legs (2), the anvil-shaped legs having respective top and bottom surfaces (20) disposed parallel to one another and to said top and bottom faces of the core, the anvil-shaped legs further including inclined flats (22) stemming from opposite unhidden side faces (11) of the core; the core having secondly opposite front and back faces (13) provided with respective front and back legs (3) in the form of four-sided truncated pyramid, one pair (31) of opposite sides of the pyramid-shaped legs stemming from the sides (21) of the anvil-shaped legs and the other pair of opposite sides (32) having their bases at least partially in common with one edge of the adjoining un-hidden side faces of the core.

8 Claims, 4 Drawing Figures

BARRIER BLOCK FOR PROTECTING COASTAL AND RIVERSIDE STRUCTURES

FIELD OF THE INVENTION

The invention relates to an artificial barrier block for defences protecting coastal and riverside structures from the forces of waves and currents. The characteristics required of artificial blocks must correspond to two aims which are considered essential, namely: stability and strength. However, it is generally found that one of these aims is achieved to the detriment of the other.

Stability depends both on how well the blocks fasten on to the sea or river bed as it slopes away from the structure to to protected, and on how well their particular shapes enable them to fit together to form a protective barrier while leaving sufficient empty spaces to damp the hydraulic energy to which the structure is subjected. The required stability therefore results from a number of parameters of which the following will here be mentioned: wave amplitude, breaker amplitude, the density of the concrete from which the blocks are made, the density of the water in which the structure is built, the slope of the barrier, and lastly, a block coefficient representative of the qualities inherent to its shape and even of its behaviour.

Block strength depends on how suitable the shape is for withstanding shocks, stresses and erosion. Block shape also affects the proper interlocking of the blocks and the index of empty space in the barrier. The empty space index must be high enough to damp the energy of the waves and to reduce the effects of low pressures as the water recedes. Now apart from the block described in French Pat. No. 1 017 546, blocks have been described which entail the juxtaposition of geometrical components whose shape makes them fragile and therefore require them to be made of concrete reinforced with expensive ironwork.

This is the case, for example, of blocks based on the design of Japanese Utility Model No. 45-15826, in which identical frusto-conical legs protrude from a cylindrical central body whose length is at least three times its diameter.

Further, the shape of these blocks is such that the forms required to cast them make them difficult to manufacture in particular because it is necessary to move the blocks when the forms are removed from around them.

Preferred embodiments of the present invention provide artificial blocks whose shape makes it possible to combine the qualities of stability and strength, while nonetheless permitting production by an easy method capable of being performed on a prefabrication slab or directly on a storage area by means of forms which do not require the blocks to be moved to remove the forms after the concrete has set.

SUMMARY OF THE INVENTION

The invention provides a barrier block for defences protecting coastal and riverside structures, wherein the block is constituted by a central core of substantially cubic shape having:

firstly top and bottom faces provided with respective top and bottom anvil-shaped legs, the anvil shaped legs having respective top and bottom surfaces disposed parallel to one another and to said top and bottom faces of the core, the anvil-shaped legs further including inclined flats stemming from opposite un-hidden side faces of the core; and secondly opposite front and back faces provided with respective front and back legs in the form of four-sided truncated pyramids, one pair of opposite sides of the pyramid-shaped legs stemming from the sides of the anvil-shaped legs and the other pair of opposite sides having their bases at least partially in common with one edge of the adjoining unhidden side faces of the core.

Preferably the edges of the legs are chamfered, and the ends of the anvil-shaped legs may be truncated; the centre parts of the top and bottom surfaces of the respective top and bottom legs may include respective transversal hollows.

The spacing between the ends of the top and bottom legs is preferably substantially equal to 1.5 times the height of the central core, the length of the top and bottom legs is substantially equal to three times the height of the central core, the width of the top and bottom legs is equal to the height of the central core, and the height of the front and back legs is substantially equal to that of the central core.

The invention also provides a method of manufacturing a block, the method being performed by casting the block in a form which has openings which correspond to the top and bottom surfaces of the top and bottom legs, one of said openings resting on a prefabrication platform, the other being used for filling the form with concrete and for vibrating the concrete inside the form.

Embodiments of the invention are described by way of example with reference to the accompanying drawings.

BRIEF DESCRIPTION OF THE DRAWINGS

FIG. 1 illustrates an artificial block with a central core 1 substantially in the form of a cube having top and bottom faces 12 provided with top and bottom legs 2, front and back faces 13 provided with front and back legs 3 and two opposite and visible, i.e. un-hidden side faces 11.

Figure 1:
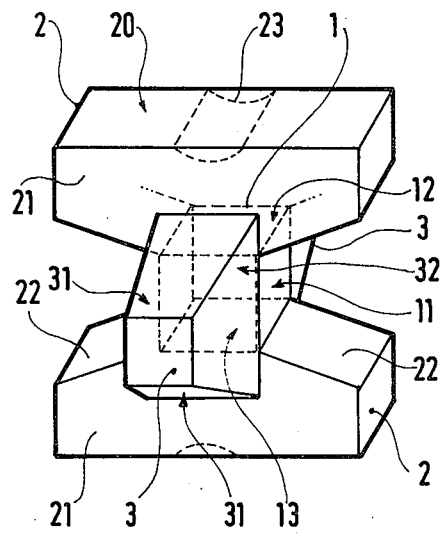
FIG. 1 is a perspective view of an artificial block in accordance with the invention.

The top and bottom legs 2 are anvil-shaped with vertical sides 21, with horizontal top and bottom surfaces 20 which are parallel to each other and to the top and bottom faces 12, and with inclined flats 22 which stem from the adjoining visible faces 11 of the core.

The front and back legs 3 are in the shape of truncated pyramides with four sides labelled in opposing pairs 31 and 32. The pyramid sides 31 overlap the anvil sides 21, from which they stem, while the bases of the pyramid sides 32 are common to the edges of the adjoining visible faces 11, with the ends of these bases where they extend beyond the visible faces 11 overlapping the adjoining anvil sides 21 to meet the bases of the pyramid sides 31.

The block has the following dimensions in terms of the side of the central core 1. The ends of the top and bottom legs 2 are separated by a distance which is substantially equal to 1.5 times the core dimension. The length of the top and bottom legs 2, i.e. the length which corresponds to the surfaces 20 is substantially equal to three times the core dimension. The width of the top and bottom legs is equal to the core dimension. The length of the front and back legs 3 is substantially equal to the core dimension.

Figure 2:
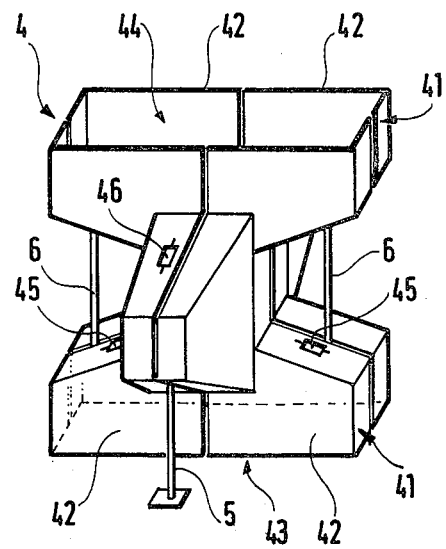
FIG. 2 is a perspective view of a form for casting the block shown in FIG. 1.

Such a block is easily manufactured by casting concrete in a form such as that illustrated in FIG. 2. The form 4 is constituted by assembling half-shells 41 which are symmetrical about the longitudinal centre plane of the top and bottom legs 2. Each of the half-shells 41 is itself constituted by an assembly of two half-shells 42 which are symmetrical about the transverse centre plane of the top and bottom legs 2.

The form 4 which corresponds to the dimensions of the block to be manufactured includes an upper opening 44 and a lower opening 43 which correspond to the horizontal surfaces 20 of the top and bottom legs 2 respectively. Also, there are windows 45 in the walls of the form which correspond to the inclined flats 22 of the bottom legs of the blocks and windows 46 in the walls which correspond to the upper pyramid sides 31 of the front and back legs 3.

Manufacture is as follows. The form 4 with its component parts 41 and 42 is assembled so as to rest, with its lower opening 43 resting on a prefabrication platform, either directly or via an interposed sheet of kraft paper or polyane. Concrete is cast via the upper opening 44, firstly up to the level of the windows 45 through which a vibrator is inserted, then up to the level of the windows 46 through which a vibrator is again inserted and lastly up to the upper opening 44 through which the vibrator is again inserted for the last time.

After waiting for a sufficient time for the concrete to set and harden, it is then possible to disassemble the component parts of the form and to recover them with a view to manufacturing another block without having to move the block which has just been cast and which can remain in place for storage.

When large blocks are to be cast, it may be advantageous to use props such as 5 between the ground and the overhanging parts of the form which correspond to the lower sides 31 of the front and back legs. It may also be advantageous to use props 6 between the parts of the form which correspond to the inclined flats 22 of the top legs 2. During the first concrete hardening stage after the form has been removed, these props 5 and 6 can be retained to support the top, front and back legs of the block thus cast.

The particular shape imparted to the block in accordance with the invention makes it possible to engage said block with adjacent blocks, whatever their positions may be.

Such blocks can be simply dumped in place or else they can be secured; in either case they can be arranged in one or several layers.

Blocks of the same layer fit into one another so as to form a solid barrier with a regular or irregular structure and providing suitable empty spaces so as to mitigate the effect of pressure drops. When the water recedes (this has been known to lead to harmful out-gassing from the concrete). The outer surface of a group of blocks is sufficiently rough and irregular to allow the following layer to fix onto it and to allow proper damping of the sea or current energy.

Fixing of the blocks together can be further improved by providing a transversal hollow or outwardly concave recess 23 in the centre part of the faces 20 of the top and bottom legs, as shown in dotted lines in FIG. 1.

Figure 3:
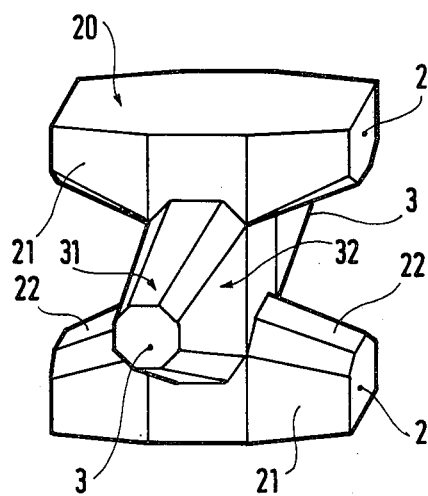
FIG. 3 is a perspective view of a variant block in accordance with the invention.

In a variant shown in FIG. 3, the ends of the anvil-shaped legs 2 are truncated along their sides 21 while the edges between adjoining sides 31 and 32 of the front and back legs 3 are chamfered as are edges between the sides 21 of the top and bottom legs 2 and their inclined flats 22.

These complementary dispositions allow even better interlocking of the blocks and increase in the index of empty space in an assembly of blocks.

Further, these dispositions are favourable to the construction of the forms, to the casting of the concrete therein, and to the ease of withdrawal of the forms after the blocks have hardened.

Figure 4:
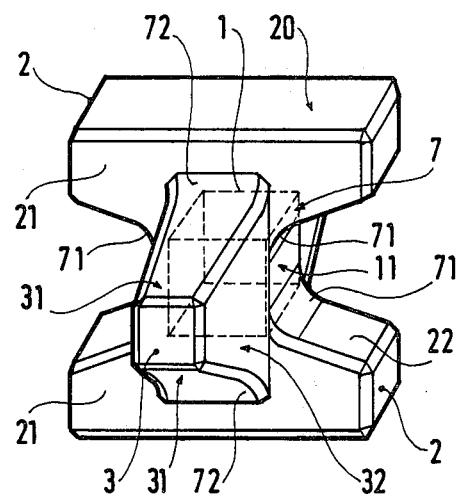
FIG. 4 is a perspective view of another variant block in accordance with the invention.

In a variant shown in FIG. 4, it has been sought to improve further the strength of the block. For this purpose, the bases of the inclined flats 22 of the top and bottom legs 2 include small overlapping portions 7 lying on the adjoining side face 11 of the cubic core 1.

Further, the sharp angles formed by the edges between the inclined flats 22 and the side surfaces 11 are replaced by rounded off portions 71.

Likewise, the sharp angles formed by the edges between the pyramid sides 31 and the anvil sides 21 are replaced by rounded off portions 72 at the bases of the pyramid sides 31.

It is evident that the invention is in no way limited to the embodiments which have just been described and illustrated and which have been given only by way of an example; the terms "top", "bottom", "front", "back" and "side" relate to the position in which the blocks are cast as shown in the drawing. Once in place in an artificial sea or river barrier they may occupy any other position, and indeed if just dumped into the water they will end up in a random configuration.

I claim:

1. A barrier block for defences protecting coastal and riverside structures, the improvement wherein the block is constituted by a central core of substantially cubic shape having laterally opposed un-hidden side faces and:

firstly top and bottom faces provided with respective top and bottom anvil-shaped legs, the anvil-shaped legs having respective top and bottom surfaces disposed parallel to one another and to said top and bottom faces of the core, the anvil-shaped legs further including inclined flats stemming from said opposite un-hidden side faces of the core; and secondly opposite front and back faces provided with respective front and back legs in the form of four-sided truncated pyramids, one pair of opposite sides of the pyramid-shaped legs stemming from the sides of the anvil-shaped legs and the other pair of opposite sides having their bases at least partially in common with one edge of the adjoining un-hidden side faces of the core, such that said one pair of opposite sides of said pyramid-shaped legs overlap and are supported by the sides of said anvil-shaped legs.

2. A block according to claim 1, wherein the edges of the legs are chamfered.

3. A block according to claim 1, wherein the ends of the anvil-shaped legs are truncated along their sides.

4. A block according to claim 1, wherein the spacing between the ends of the top and bottom legs is substantially equal to 1½ times the height of the central core.

5. A block according to claim 1, wherein the length of the top and bottom legs is substantially equal to three times the height of the central core.

6. A block according to claim 1, wherein the width of the top and bottom legs is equal to the height of the central core.

7. A block according to claim 1, wherein the height of the front and back legs is substantially equal to that of the central core.

8. A block according to claim 1, wherein the top and bottom surfaces of the respective top and bottom legs include respective transversal hollows at their centers.

* * * * *